Figure 6:
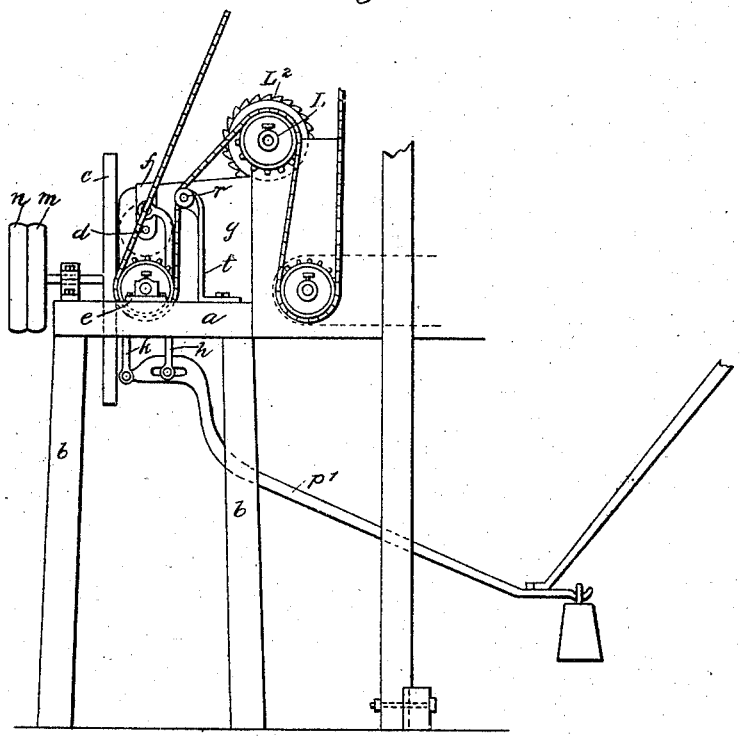

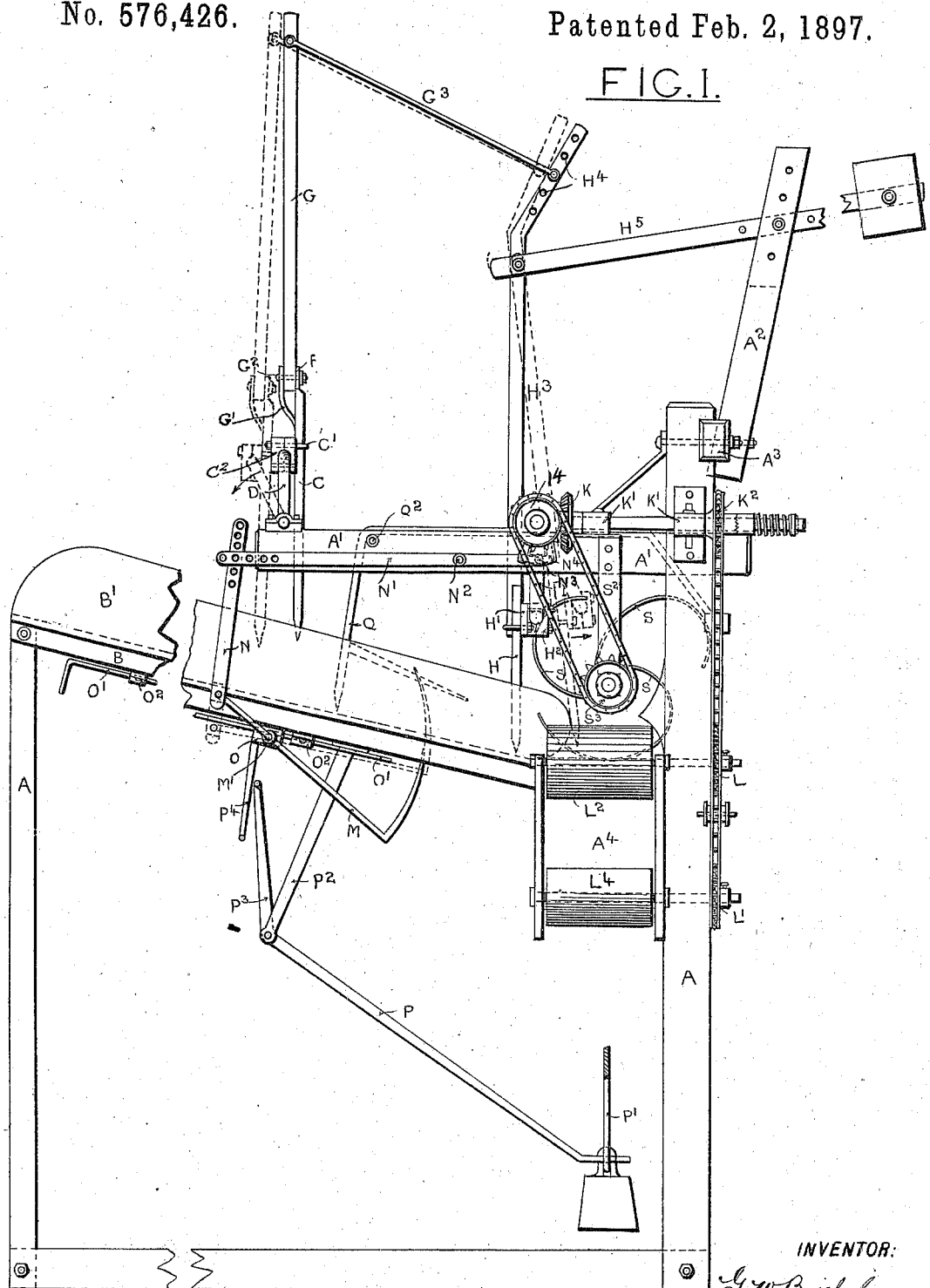

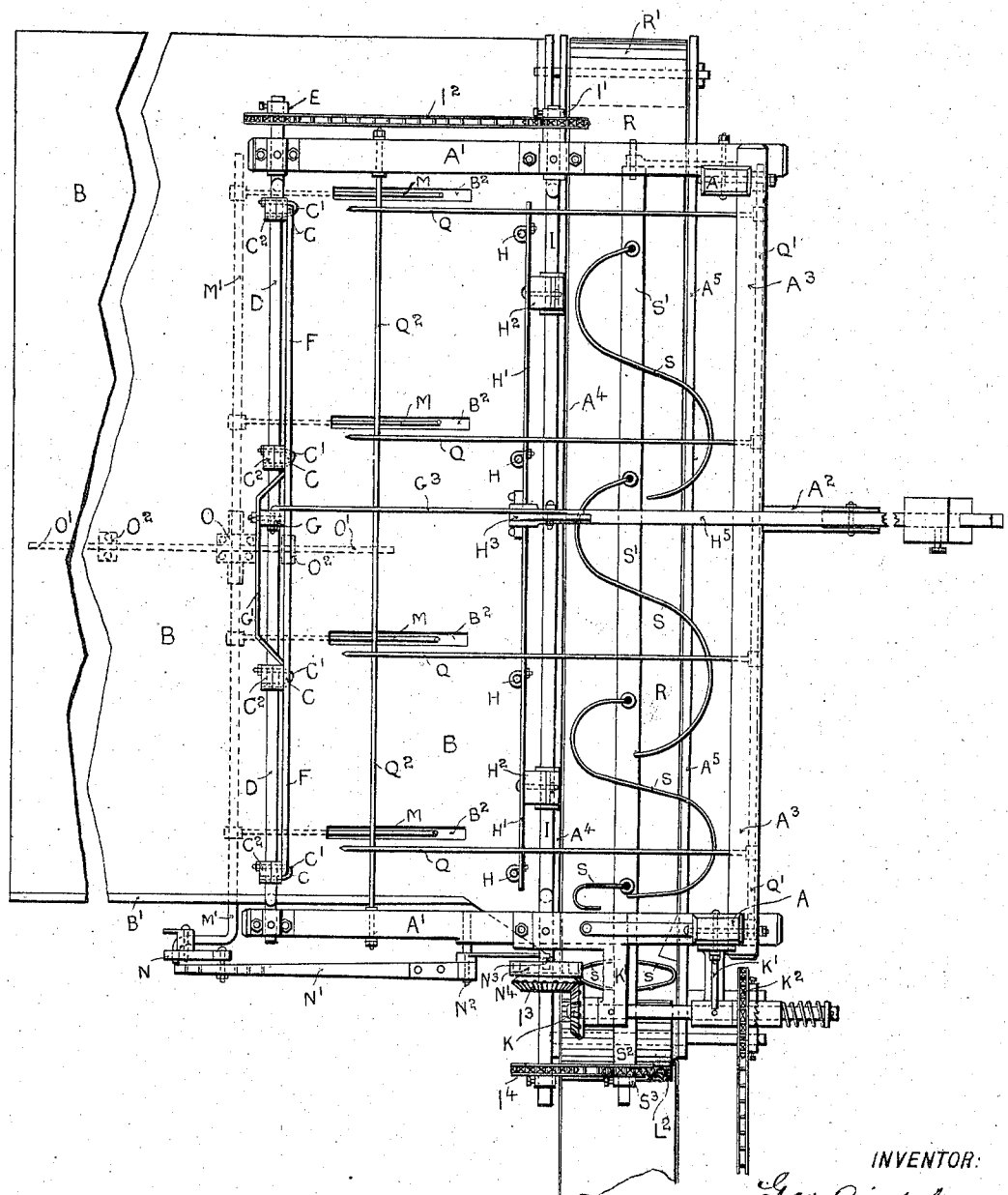
(No Model.)
G. W. BISCHOF.
FEEDER FOR HAY CUTTERS.
No. 576,426. Patented Feb. 2, 1897.
FIG. II.

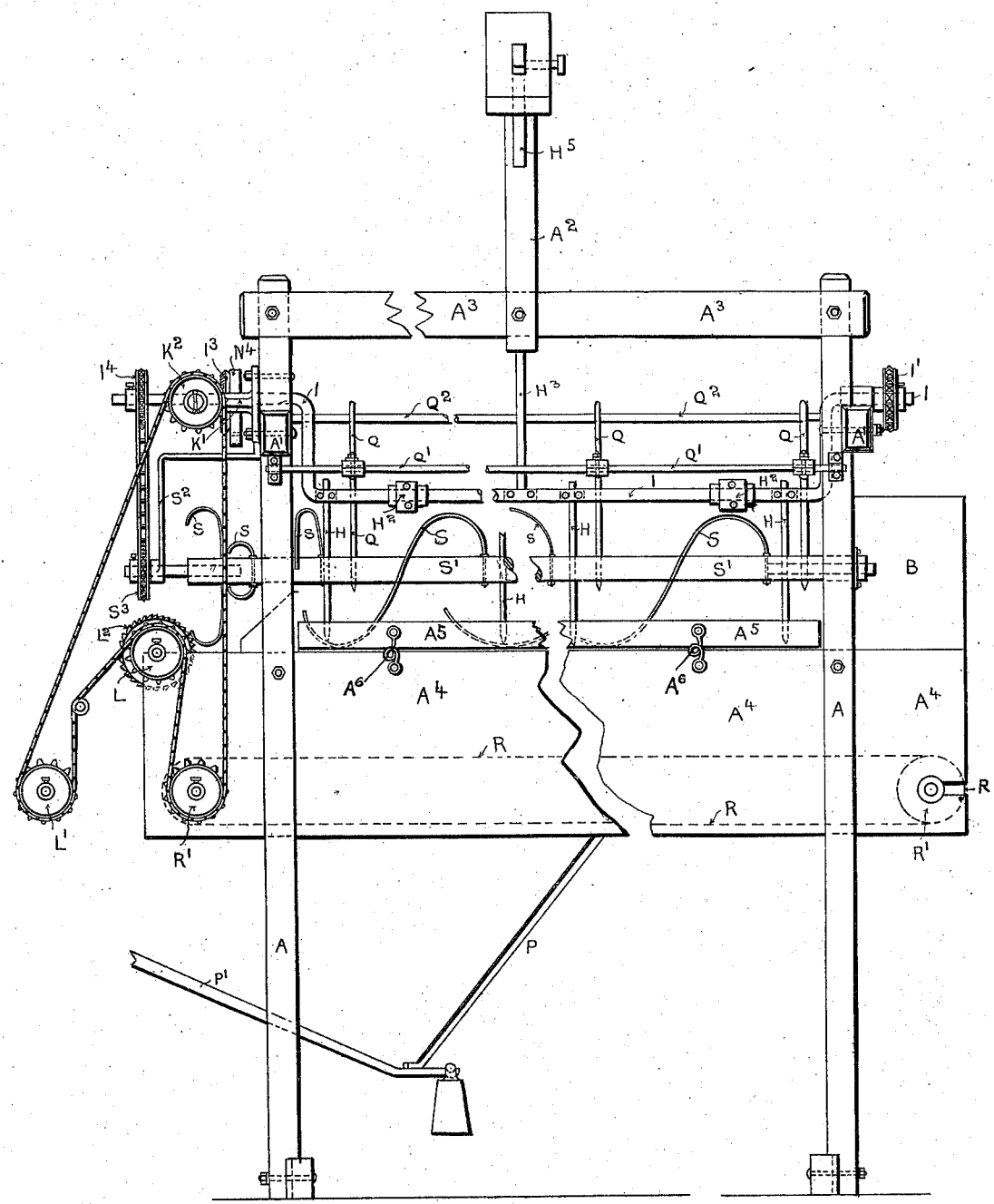

(No Model.) 5 Sheets—Sheet 4.
G. W. BISCHOF.
FEEDER FOR HAY CUTTERS.
No. 576,426. Patented Feb. 2, 1897.
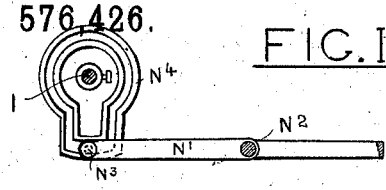
FIG. IV.
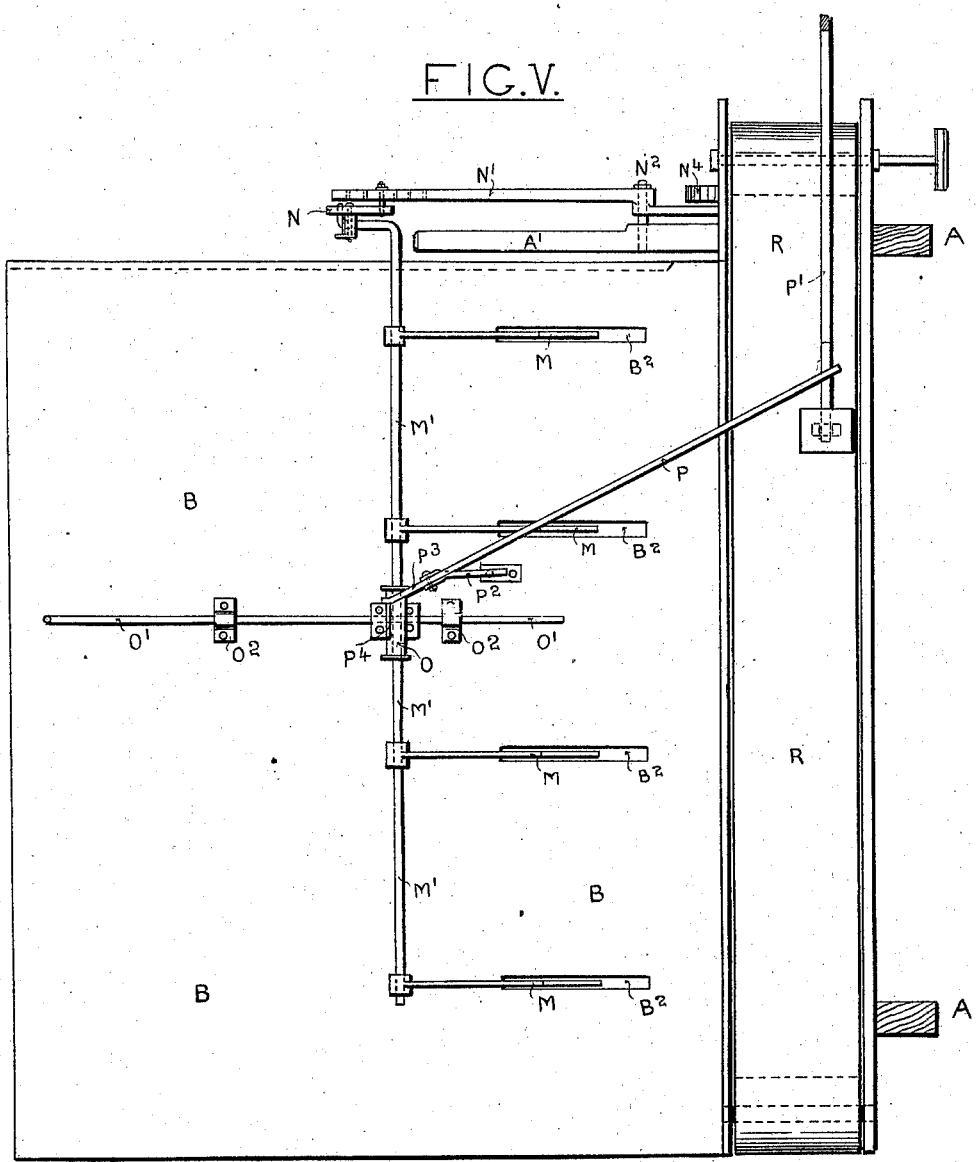
FIG. V.
WITNESSES
C. R. Ferguson
C. Sedgwick
INVENTOR:
G. W. Bischof
BY
ATTORNEYS (No Model.)　　　　　　G. W. BISCHOF.　　　　5 Sheets—Sheet 5.
FEEDER FOR HAY CUTTERS.

No. 576,426.　　　　　　　　　Patented Feb. 2, 1897.

UNITED STATES PATENT OFFICE.

GEORGE WILLIAM BISCHOF, OF MALLALA, SOUTH AUSTRALIA, ASSIGNOR OF ONE-HALF TO JOHN FELIX MARTIN, OF GAWLER, SOUTH AUSTRALIA.

FEEDER FOR HAY-CUTTERS.

SPECIFICATION forming part of Letters Patent No. 576,426, dated February 2, 1897.

Application filed April 19, 1895. Serial No. 546,353. (No model.)

*To all whom it may concern:*

Be it known that I, GEORGE WILLIAM BISCHOF, farmer, a subject of the Queen of Great Britain, and a resident of Mallala, in the Province of South Australia, have invented Improvements in Devices for Automatically Feeding Hay to Power Chaff-Cutting Machines, of which the following is a specification.

My invention relates to certain improvements in devices for automatically feeding hay to power chaff-cutting machines.

The objects of my invention are, first, to provide an automatic continuous feed; secondly, to control and adjust such feed to the capacity of the cutting apparatus; thirdly, to "pack" or otherwise gather together the loose hay into a suitable condition for being delivered to the feed-band supplying the feed-rollers of the cutting-machine; fourthly, to deliver the hay received from the packers in a constant and well-distributed stream to the feed-rollers. I accomplish these objects by the mechanism and devices illustrated in the accompanying drawings, in which—

Figure 1 is an elevation of the machine; Fig. 2, a plan of same; Fig. 3, a front longitudinal elevation of a portion of the same; Fig. 4, a detail of cam attachment for actuating the stops; Fig. 5, underneath view of platform, showing the automatic device for adjusting the stops. Fig. 6 is an elevation of a portion of the machine, being a continuation of Fig. 3.

A is the main framework of the machine, to which is bolted an inclined platform B, provided with suitable ends B' and with slots B², for the purpose hereinafter described.

The hay from the stack is intended to be thrown loosely upon the platform B, and sliding forward upon its inclined plane it is caught by a series of first packers C. In the accompanying drawings the packers are arranged in a series of four, but may be of any suitable number. The packers C consist of a short bar of spring-steel connected by means of a hooked bolt C' to a block C², which in turn is secured loosely upon a crank-shaft D. The crank-shaft D revolves in suitable bearings fixed to two cross-pieces A' A', bolted at right angles to either end of the main framework A, and is driven by a sprocket-wheel E, secured at its rear end. In order to render the action of the several packers C uniform and their angle with the platform B adjustable, each packer is secured by means of a screw-bolt to a bar F, which runs the full length, the two end packers C being secured to its two outer ends.

For the purpose of adjustment of the angle of the packers C with the platform B an upright bar G is bolted to about the center of the bar F, and for greater rigidity a bent bar G' is provided, the two ends of which are flattened out in order that the screw-bolts C' of the inner packers C may pass through them and securely bolt the whole together. The bar G' bends upward in the center and is securely bolted by a bolt G², which passes through the bar G', the upright G, and the connecting-bar F. The head of the upright bar G is connected with a series of second packers H by means of a connecting-rod G³. The second packers H also are, say, four in number and consist, severally, of bars of spring-steel projecting downward, the whole being securely bolted to a flat longitudinal bar H', which in its turn is securely bolted to blocks H², revolving loosely on a crank-shaft I.

The crank-shaft I revolves in suitable bearings in the two cross-pieces A', previously referred to, and has at its rearmost end a sprocket-wheel I', from which power is imparted by means of a connecting-chain I² to the sprocket-wheel E of the first series of packers C. To the bar H' is bolted an upright H³ at about its center, the upper end of which is bent backward and is provided with a series of holes H⁴, to one or other of which the rod G³ is secured by means of a screw-bolt. To the upper part of the upright bar H³ and below the bend is loosely secured, by means of a screw-bolt, a bar H⁵, the outer end of which is provided with a weight or counterpoise. The bar H⁵ itself is provided with a series of holes, through one of which a screw-bolt is passed, securing it loosely to an upright post or beam A², bolted to a longitudinal beam A³ of the main framework A. The crank-shaft I is driven by means of a beveled gear-wheel I³, keyed to its front end and actuated by a beveled wheel K, keyed to a shaft revolving in suitable standards K', secured to the front of the cross-beam A' of the main framework A. The beveled wheel K is actuated by a sprocket-wheel K², provided with a clutch attachment for throwing it in and out of gear. The sprocket-wheel K² is actuated by means of a chain driven by a sprocket-wheel L', fixed to the spindle of the lower feed-roller L⁴ of the cutting-machine, as shown more particularly in Fig. 3. The same chain actuates also a sprocket-wheel L, fixed to the spindle of a supplementary corrugated roller L², intended for pressing the hay before it reaches the feed-rollers.

It will be readily seen that by the revolution of the crank D the first packers C have a rotary gathering motion, which as they descend and move forward causes them to carry in front of them a portion of the hay. In order that this may be packed in suitable trusses or quantities, a series of stops M are provided. These consist of a series of hooks, say four, as shown more particularly in Fig. 1, the ends of which project upward through the slots B² in the platform B when the series of the first packers C is down, but fall below the surface of the platform as the series of packers C rise. Each of the series of stops M is rigidly attached to the bar M', extending the full length necessary underneath the platform B, as shown more particularly in Fig. 5 and by dotted lines in Fig. 2. The bar M' is cranked at its foremost part and the point of the crank loosely secured to an upright N, the upper end of which is provided with a series of holes for the purpose of adjustment. Through one of these holes a screw-bolt is passed, loosely securing the upright N to the bar N'. The bar N' is pivoted or otherwise loosely secured, by means of a screw-bolt N², to the front cross-beam A' of the main framework A, and at its front end is turned outward at a right angle, in order to form a pin or stud N³, which engages a slot in a cam attachment N⁴, fixed to the beveled driving-wheel I³. By this cam attachment N⁴, as the beveled wheel I³ revolves, (actuating the first and second series of packers C and H,) by means of connecting-levers N and N', the series of stops M is caused to simultaneously rise and fall.

In order to adjust the distance between the stops M and the first packers C, and by this means control the size of the truss or quantity of hay to be delivered to the machine, a device is provided so that such distance may be automatically controlled by the action of the feed-rollers or may be adjusted by the operator in charge. This is effected by the central boss O, which carries the bar M', being fixed to the rod O', turned up at its outer end in order to form a handle and provided with slide-pieces O², fixed underneath the platform B. By drawing backward or forward the rod O' in the slide-pieces O² the bar M', carrying the stops M, is carried backward or forward and the distance between the stops M and the first packers C correspondingly affected. In order to secure an automatic adjustment, a rod P is carried from a lever P', from which is suspended the weight controlling the feed-rollers of the cutting-machine in the ordinary manner. The bar P is loosely secured by means of a screw-bolt to a bracket P², projecting downward underneath about the center of the platform B, and is constructed with a projecting piece P³, turned up at an angle and so arranged as to engage a bar P⁴, projecting downward from and fixed to the central boss O. By this device any alteration in the distance in the feed-rollers, causing the lever P' to rise or fall, is immediately communicated to the stops M, so that if the quantity of hay being supplied to the feed-rolls is too great the projecting piece P³ immediately engages the bar P⁴, pressing it backward and reducing the size of the truss delivered by causing the stops M to approach the first packers C. This will continue until, the feed-rolls becoming less burdened and the pressure upon P⁴ relieved, the stops M will assume their normal position under pressure from the hay fed against them by the first packers C. As a means for actuating the lever P', I employ the construction shown in Fig. 6, in which $b$ indicates legs for supporting the cross-beam $a$, and upon the frame so formed is mounted a shaft carrying a disk or fly-wheel $c$, upon which the cutting-knives are located. Fast- and-loose pulleys $m$ $n$ are secured to the shaft. The lower feed-roller L' is mounted on a shaft $e$, having bearings in the side boards $g$, and upon one end of this shaft $e$ is a sprocket-wheel engaged by the driving-chain, which bears against a roller $r$, journaled upon a bracket $t$, secured to the cross-beam $a$.

The upper feed-roller (indicated by dotted lines) is secured to a shaft $d$, having bearings in sliding blocks $f$, which move vertically in slots formed in the side boards $g$. To these blocks $f$ are secured rods $h$, which at their lower ends are pivotally connected with the lever P'. The end of the lever P' is pivoted to a hanger $k$ on a cross-beam $a$.

In order to retain the truss or quantity of hay pressed by the first packers C against the stops M and hold it in position for the action of the second packers H, a series of holding-rods, say four in number, is provided. These are constructed with a downward point and with a bar projecting from such point at an angle toward the stops M in order to compress the truss, as shown more particularly by dotted lines in Fig. 1. The rods Q are of the shape as shown, being bent downward at their forward end, where they are fixed to a bar Q', loosely secured in suitable bearings to the front of the longitudinal frame-bar A³ of the main framework A. A bar Q² is bolted through and extends the full length between two cross-pieces A' to the main framework A. The holding-rods Q are actuated by means of the crank-shaft I, the whole being lifted together as the crank rises and dropping again by their own weight upon the bar Q² as the crank-shaft I falls. In this way the hay carried forward by the first packers C against the stops M is still further compressed and held in position by the holding-rods Q. It is then engaged by the second packers H, by the forward motion of which, as these stops M fall below the surface of the platform, the trusses or other regulated quantities are carried forward into a trough A⁴, arranged in front of and below the edge of the platform B, from which trough they are fed to the rollers of the cutting-machine. It will be readily perceived that the holding-rods Q are not raised into position to allow a further quantity of hay to pass against the stops M until the second packers H have carried forward into the trough A⁴ that already gathered and compressed. The outer edge of the trough A⁴, Fig. 3, is provided with a board A⁵, secured thereto by springs A⁶, and which prevents any of the hay from being carried over the side. Within the trough A⁴ is placed a longitudinal revolving canvas band R, actuated by rollers R' R'. The roller R' is driven by a sprocket-wheel connected by the driving-chain from the bottom feed-roller L' of the cutting portion of the machine, as previously referred to and as shown more particularly in Fig. 3. By means of this canvas band R the hay is carried forward to the feed-rollers for cutting in the ordinary manner.

In order that the hay may be evenly distributed in a convenient form upon the revolving canvas band R, a series of revolving spiral springs are provided. These consist of spiral springs of steel S, bolted or otherwise secured to a revolving wooden beam S'. The beam S' is provided with suitable pivots or bars at either end, the rear end revolving in suitable bearings in the main framework A and the front end in a bracket S², bolted to a cross-beam A' of the main framework A. To the front pivot or bar of the wooden beam S' is fixed a sprocket-wheel S³, by means of which motion is imparted by means of a linked chain from the sprocket-wheel I⁴, fixed to the end of the crank I. By the action of these spiral springs S the hay is evenly distributed and compressed over the face of the revolving canvas R. From the revolving canvas R it passes under a corrugated supplementary roller L², driven by the sprocket-wheel L, and thence to the feed-rollers of the cutting-machine.

Though preferring the method as shown for actuating the first and second packers and placing them above the platform, the position of the devices may be reversed and the packers placed underneath the platform, suitable slots being provided through which they may effect their purpose. In place of the spiral springs S and the revolving beam S' there may be provided an upper revolving canvas extending the full length of the trough A⁴ and provided with projecting bars on the inner side which are engaged by the revolving crank I, the rollers carrying the canvas being so arranged as to tilt on one side under the action of the crank, returning to their former position by their own weight as soon as the crank I has passed; or there may be provided a short revolving canvas extending, say, half the distance down the trough, which canvas may be so arranged as to tilt upward, for which purpose a projecting arm is fixed to the frame carrying the rollers and actuated by the crank I, so that the rear end of the canvas is lifted with each revolution of the crank and falls again into position as it passes; or in place of either a rising-and-falling framework may be provided for effecting the same purpose. When from any cause it is desired to adjust the angle of the first packers C, in order to cause them to be more or less upright, and consequently to gather with each motion a greater or lesser quantity of the hay thrown loosely upon the platform, such adjustment is accomplished by shifting the end of the rod G³ to another hole in the rod H³. Similarly, if from any cause it is desired to adjust the angle of the second packers H to accomplish a similar purpose, this adjustment is effected by adjusting the bar H⁵ in its relation to the upright post or beam A².

In action the hay is thrown loosely upon the platform B and is first caught by the revolving packers C. It is drawn forward by these against the stops M, which have risen simultaneously with the action of the packers C, the holding-rods Q being meanwhile raised by the action of the revolving crank I. As the crank I descends the holding-rods Q fall, compressing the hay into a more compact truss. The truss of hay is then engaged by the second packers H and carried forward onto the revolving canvas R into the trough A⁴. On falling upon the revolving canvas it is evenly spread by constant pressure from the revolving spiral springs S and is carried forward endwise under the extra corrugated roller, driven by the sprocket-wheel L, to the feed-rollers of the chaff-cutting machine.

If from any cause too large a quantity of hay is being supplied to the feed-rollers, and consequently the latter are becoming choked, the action of the feed-rollers in opening will impart movement to the stops M from the connecting-lever P, the stops M will move closer to the first packers C, and the size of the truss will be diminished. As soon as the pressure is relieved and the feed-rollers close, the stops M will automatically resume their former position and permit of the former quantity or size of truss.

Having now particularly described and ascertained the nature of my said invention and in what manner the same is to be performed, I declare that what I claim is—

1. In a device for feeding material to a chaff-cutting machine, the combination with a slotted table, and driving mechanism, of two series of packers having a vertical and a back-and-forth motion, the movements of one series alternating with the movements of the other series, the stop-arms movable through the slots in the table, the series of holding-rods arranged above the table between the packers and stops, each of said holding-rods having an arm projecting forward of the stops, a receiving-trough at the front end of the table and an endless carrier movable therein, substantially as specified.

2. In combination with the inclined slotted table, the series of packers, mechanism comprising a crank-shaft for imparting a vertical and back-and-forth movement to said packers, the stop-arms movable through the slots in the table, vertically-movable holding-rods arranged between the packers and stops above the table and having the forwardly-projecting portions, a second series of packers forward of the stops, mechanism comprising a crank-shaft for imparting a vertical and back-and-forth movements to said second packers, the movements of the second packers alternating with those of the packers first named, and the endless carrier, substantially as specified.

3. In combination with the inclined slotted table, the packers and the holders, of the endless carrier at the front of the table, the feeding-rollers, the stops movable through the slots in the table and connections between one of the feed-rollers and the stops for automatically adjusting the stops with relation to the packers, substantially as specified.

4. The combination with the slotted table, of the stops movable through said slots, a series of packers mounted on a crank-shaft, the bar extending upward from the crank-shaft, a second series of packers mounted on a crank-shaft, a bar extended upward from said crank-shaft and having a forwardly-inclined upper portion, a link having a pivotal connection with the bar extended from the first-named crank-shaft and having its opposite end adjustable along the inclined portion of the second-named bar, and an endless carrier for receiving material from the second series of packers, substantially as specified.

5. In combination with the frame, the slotted table, the first series of packers and the stops, of the second series of packers, a crank-shaft carrying said second series of packers, the series of holding-rods each comprising a body portion extended longitudinally of the frame, a downwardly-extended portion and a bar extended forward therefrom the ends of the body portions of the holding-rods having pivotal connection with the frame and a vertical motion being imparted thereto by the crank-shaft of the second series of packers, and a stop-rod for limiting the downward movement of the holding-rods, substantially as specified.

6. In the combination with an inclined table and mechanism substantially such as described for carrying material forward thereon, of a receiving-trough, a spring-yielding board on the outer upper edge thereof, an endless carrier in the trough, and feed-rollers, substantially as specified.

In testimony that I claim the foregoing as my invention I have signed my name, in presence of two witnesses, this 25th day of February, 1895.

GEORGE WILLIAM BISCHOF.

Witnesses:
JOHN KENNARE,
JAMES FERGUSS, 2d.